Feb. 3, 1942.  G. L. OLSON  2,271,567
SHAFT COUPLING
Filed April 11, 1939
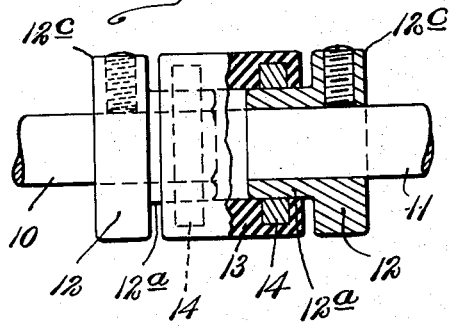
Fig. 1.
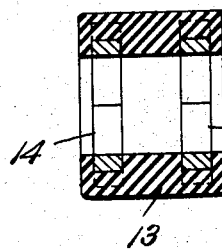
Fig. 2.
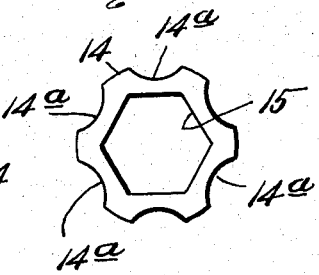
Fig. 3.
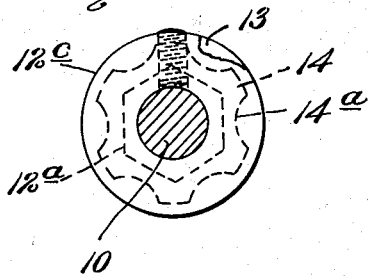
Fig. 4.
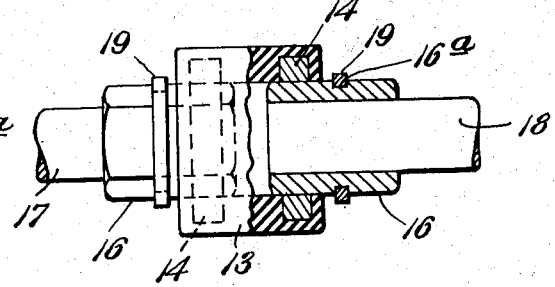
Fig. 5.
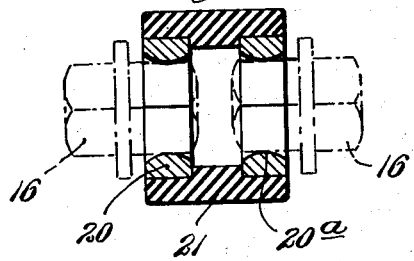
Fig. 7.
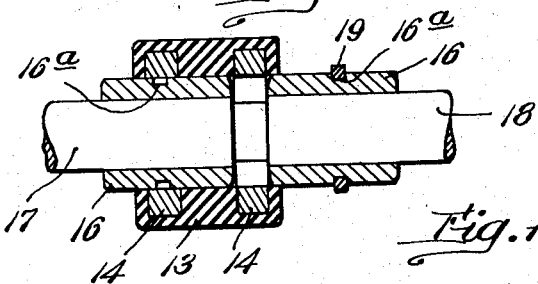
Fig. 6.
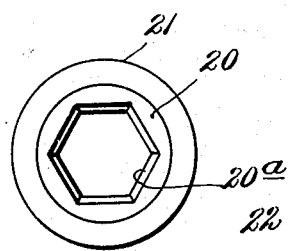
Fig. 8.
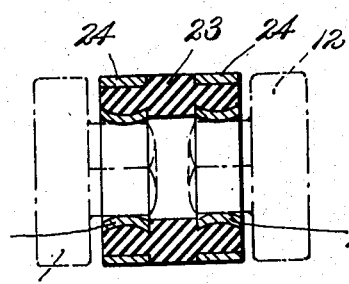
Fig. 9.
Fig. 10.
Inventor.
GORDON L. OLSON
by Ernest R. Llewellyn
atty.

Patented Feb. 3, 1942

2,271,567

UNITED STATES PATENT OFFICE 2,271,567

SHAFT COUPLING

Gordon L. Olson, Arlington, Mass.

Application April 11, 1939, Serial No. 267,212

3 Claims. (Cl. 64—11)

This invention relates to shaft couplings and more particularly to couplings adapted to be disposed between opposed rotative shafts or like elements in a manner so as to permit of coaxial movement and/or a yielding torsional movement between the opposed elements.

One of the primary objects of the present invention is to provide a simple and inexpensively constructed serviceable coupling that will permit of a coaxial movement between two opposed elements and which will not be subject to the usually excessive wear while in operation, with the attendent requirement for a frequent replacement of parts.

Another object of the invention is to provide a coupling that will permit of a combined coaxial and/or yielding torsional movement and wherein the parts subject to the greatest service are arranged to give a maximum of wearing surface and thus eliminate a requirement for excessive frequent replacement of worn parts.

A further object of the invention is to provide a simple coupling comprising few parts and that may be readily and conveniently assembled with its cooperating element or disconnected therefrom as occasion requires.

With the above and other objects in view, as will be apparent from the following description, the invention comprises a novel combination and arrangement of parts hereinafter more fully described and specifically pointed out in the appended claims.

In the accompanying drawing I have shown my device together with modifications thereof, that illustrate the possibilities of the many modifications that may be made therein, sufficient to enable those skilled in the art to understand the construction and operation thereof.

Referring to the drawing:

Fig. 1 is a side elevation, partially in section, showing the coupling in an assembled relation.

Fig. 2 is a longitudinal section of the coupling housing with opposed multi-faced inserts assembled therewith.

Fig. 3 is a detail of one of the multi-faced inserts.

Fig. 4 is an end view of the assembly shown in Fig. 1.

Fig. 5 is a view corresponding substantially to Fig. 1, but shows a modified form of adapter assembled with the coupling.

Fig. 6 is a view corresponding substantially to Fig. 5, but shows the coupling in a partially disassembled relation.

Fig. 7 is a view showing a modified form of the multi-faced inserts assembled with the coupling housing.

Fig. 8 is an end view of the assembly shown at Fig. 7.

Fig. 9 shows the resilient coupling housing assembled with still another form of non-resilient multi-faced inserts.

Fig. 10 is a view of a modified form of the coupling housing.

In the device illustrated at Fig. 1, the shafts 10, 11 are of the usual cylindrical construction. Secured to each of the inner terminating ends of these shafts 10, 11 is an adapter 12, 12 having a portion 12a that is formed with multi-sided faces and may be on the order of from two or more, as, for example, a hexagonal or like nut.

Secured in a resilient housing 13 are non-resilient inserts 14 that are preferably provided with a scalloped or like periphery 14a that, when moulded with the housing 13, lend greater resistance to the inserts 14 rotating in the housing. It is obvious that this resistance against rotation may be accomplished in devious ways such, for example, as providing the inserts with a plurality of holes into which the resilient material may extend. These inserts 14 are provided with a multi-faced opening 15 and are adapted to engage with the like faced portion 12a of the adapters. It is to be noted that each of the adapters 12 is provided with an enlarged portion 12c that limits longitudinal movement of the coupling.

With this above construction, the resilient housing 13 permits of both a torsional and axially aligned movement between the shafts 10, 11 while the multi-faced inserts 14 and adapters 12 provide a greater locking and wearing surface relative to the torsional movement between the shafts.

Further, it is obvious that the thickness of the walls of the housing may be varied and proportioned so as to be gauged to break down at a given inch pounds or like brake torque; thus providing a safety factor relative to over-loading of the driving and driven members.

At Fig. 5 I have shown a modified form of adapter 16 that may be welded or otherwise permanently secured to the shafts 17, 18. The outer periphery of the adapter is formed with multi-faces as above described although, in this instance, the periphery is provided with an annular groove 16a adapted to receive a snap lock ring 19 which may be of the usual and well known construction. These rings 19 function to limit longitudinal movement of the coupling. It is obvious that the ends of the shafts themselves may be formed with the multi-faces and, while lacking some of the advantages of the adapters, as will later be pointed out, such modification is to be considered within the scope of the present invention.

The illustrated adapters 12, 16 may be applied to the usual shaft ends without a requirement for special machining and/or alteration of the shafts themselves.

At Fig. 6, the ring 19 normally associated with the left hand adapter 16 is shown removed and the coupling housing 13 moved to the left so as to substantially disengage it from the right hand adapter and in a manner that permits of a convenient removal of the devices with which the driving and driven shafts may be associated.

The inserts 20 associated with the housing 21, Fig. 7, are each provided with openings having multi-faces 20a and the faces, in this instance, are formed with a convex contour relative to the axis of the opening. With this construction, the adapters have substantially a line contact with the faces 20a and are thus permitted to rock axially while engaged with the coupling housing inserts 20. Thus, the resilient housing 21 is only required to function relative to the torsional movement of the opposed adapters 16.

Fig. 9 illustrates still another modified form of insert substantially as illustrated at Fig. 7, but in this instance, the inserts 22 are of what may be conveniently termed a shell construction. In this instance, the inserts 22 are non-rotatably associated with the housing 23 with reinforcing bands 24 engaging with the outer face of the housing and disposed opposite the inserts.

In the modified form of coupling illustrated at Fig. 10, the housing 24 and multi-faces 25 are of metal and formed in one part. The multi-faces 25 are provided with a convex contour relative to the axis of the housing. This construction is adapted to a coupling application wherein a non-yielding torsional drive is required while permitting self-aligning or axial movement of a driving and driven member.

Having thus described my invention, what I claim is:

1. In a flexible coupling for interconnecting two substantially alined shafts, a pair of coupling members adapted to be secured to the shafts, a resilient housing provided with a bore therethrough, a rigid annular insert fixedly mounted in each end of the bore of said housing, said inserts having a multi-face aperture and said coupling members having each a correspondingly shaped axially extending portion projecting, axially movable, into said aperture, thus drivingly connecting the coupling members with their respective inserts, the faces forming the aperture of said annular inserts having each a convex contour relative to the axis of the bore so as to make substantially a line contact, with the axially extending portions of said coupling members, thus permitting a tilting adjustment of the coupling members relative to said housing, and means on said coupling members for limiting the axial movement of the same relatively to said housing.

2. In a flexible coupling for interconnecting two substantially alined shafts, a pair of coupling members adapted to be secured to the shafts, a resilient housing provided with a bore therethrough, a rigid annular insert fixedly mounted in each end of the bore of said housing, said inserts having a symmetric multi-face aperture and said coupling members having each a correspondingly shaped axially extending portion projecting, axially movable, into said aperture, thus drivingly connecting the coupling members with their respective inserts, the faces forming the aperture of said annular inserts having each a convex contour relative to the axis of the bore so as to make substantially a line contact with the axially extending portions of said coupling members, thus permitting a tilting adjustment of the coupling members relative to said housing, and a flange on said coupling members for limiting the axial movement of the same relatively to said housing.

3. In a flexible coupling for interconnecting two substantially alined shafts, a pair of coupling members adapted to be secured to the shafts, a resilient housing provided with a bore therethrough, a rigid annular insert fixedly mounted in each end of the bore of said housing, said inserts having a multi-face aperture and said coupling members having each a correspondingly shaped axially extending portion projecting, axially movable, into said aperture, thus drivingly connecting the coupling members with their respective inserts, the faces forming the aperture of said annular inserts having each a convex contour relative to the axis of the bore so as to make substantially a line contact with the cooperating faces on said coupling members, thus permitting a tilting adjustment of the coupling members relative to said housing.

GORDON L. OLSON.